US012045587B2

(12) United States Patent
Molchanov et al.

(10) Patent No.: US 12,045,587 B2
(45) Date of Patent: Jul. 23, 2024

(54) CONTROLLING VISIBILTY OF UI REGIONS IN CONTINUOUS INTEGRATION ENVIRONMENT (71) Applicant: Dell Products L.P., Round Rock, TX (US)

(72) Inventors: Dmitry Molchanov, Saint Petersburg (RU); Maxim Sklyarov, Saint Petersburg (RU); Andrey Schipilo, Saint Petersburg (RU); Vladislav Belogrudov, Saint Petersburg (RU)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/896,347

(22) Filed: Aug. 26, 2022

(65) Prior Publication Data

US 2023/0229404 A1 Jul. 20, 2023

(30) Foreign Application Priority Data

Jan. 18, 2022 (RU) .............................. RU2022101020

(51) Int. Cl.
*G06F 3/048* (2013.01)
*G06F 8/38* (2018.01)
*G06F 8/71* (2018.01)
*G06F 9/451* (2018.01)

(52) U.S. Cl.
CPC ............... *G06F 8/38* (2013.01); *G06F 3/048* (2013.01); *G06F 8/71* (2013.01); *G06F 9/451* (2018.02)

(58) Field of Classification Search
None
See application file for complete search history.

(56) References Cited

U.S. PATENT DOCUMENTS

| 9,886,175 | B1 * | 2/2018 | Cox | G06F 9/451 |
| 2003/0236775 | A1 * | 12/2003 | Patterson | G06F 11/368 |
| 2004/0143567 | A1 * | 7/2004 | Dettinger | G06F 16/242 |
| 2013/0298047 | A1 * | 11/2013 | Buehler | G06F 16/958 |
| | | | | 715/760 |
| 2014/0090008 | A1 * | 3/2014 | Li | G06F 21/6263 |
| | | | | 726/1 |
| 2017/0010889 | A1 * | 1/2017 | Spektor | G06F 8/71 |
| 2017/0060368 | A1 * | 3/2017 | Kochura | G06F 9/451 |
| 2017/0279869 | A1 * | 9/2017 | Neagu | H04L 67/146 |

OTHER PUBLICATIONS

Active Choices Plugin: Originally downloaded Dec. 1, 2021 from https://plugins.jenkins.io/uno-choice/.
Dynamic and reactive parameterization in Jenkins pipelines using HTML, Groovy, and Bash. Esteban Echavarria Collazos; May 12, 2021; downloaded Oct. 3, 2022.
Active Choices Reactive Reference Parameter in jenkins pipeline. 2017; downloaded Oct. 3, 2022 from https://stackoverflow.com/questions/43410204/active-choices-reactive-reference-parameter-in-jenkins-pipelinefd.

* cited by examiner

*Primary Examiner* — Xuyang Xia
(74) *Attorney, Agent, or Firm* — BainwoodHuang (57) ABSTRACT

A technique for managing a user interface in a continuous integration (CI) environment includes providing user-interface (UI) regions in a UI page downloaded from a server. The UI regions correspond to respective parameters of a CI job. In response to a change in a particular parameter associated with a UI region, the technique further includes updating, by the server, the UI page to contain code configured to hide a specified set of other UI regions, such as those rendered irrelevant based on the parameter change.

22 Claims, 8 Drawing Sheets

P0 → Setup Kubernetes?: ☐
Check to install Kubernetes

P1 → Kubernetes: [▽] [▽]
Select major and minor version

P2 → Master Node(s): 10.255.105.1
10.255.105.1
Select 1 for single master, 3, 5, or 7 for multi-master P3 → KubeConfig
Paste your kube config here

*FIG. 4a*

P0 → Setup Kubernetes?: ☑
Check to install Kubernetes

P1 → Kubernetes: [▼] [▼]
Select major and minor version

P2 → Master Node(s): 10.255.105.1
10.255.105.1
Select 1 for single master, 3, 5, or 7 for multi-master

*FIG. 4b*

P0 → Setup Kubernetes?: ☐
Check to install Kubernetes

P3 → KubeConfig [ ]
Paste your kube config here

CONTROLLING VISIBILTY OF UI REGIONS IN CONTINUOUS INTEGRATION ENVIRONMENT

BACKGROUND

Continuous integration (CI) tools are software programs that facilitate continuous development, test, and deployment of software from multiple contributors. For example, software developers may submit their new or revised code into a source code environment at any point in time, and the software tools can automatically test, integrate, and deploy the code as part of an overall build. Examples of such CI tools include Jenkins, CircleCI, TeamCity, Bamboo, and GitLab.

CI tools support the execution of CI jobs, which may involve numerous activities performed on any number of computers over a network. A CI job generally runs in response to many parameters, which may be selected by a user. For example, a CI tool may present a user interface (UI) which allows a user to enter parameter choices. The parameter choices may be provided as checkboxes, drop-down lists, radio buttons, freeform text fields, and the like. The user generally selects or otherwise enters desired parameters, and the CI job runs based on the specified parameters.

SUMMARY

Some CI jobs define parameters that number in the tens or hundreds. Unfortunately, many CI tools are not flexible in terms of their user interfaces. For instance, a CI tool may display UI content for all parameters defined for a CI job, even if many of those parameters are not relevant to a particular execution of the CI job. As a specific example, a CI job may define a parameter for "Start Virtual Machine?," which may be set to true or false. If a user operating the user interface of this CI job chooses "true," then the user may enter a selection for a parameter called "VM name," which provides the name of the particular virtual machine to be started. But if the user chooses "false," then no VM name information is needed. Nevertheless, the CI tool may still display the UI content for VM name, even though this parameter has been rendered irrelevant based on the user's earlier selection. The result of this arrangement is that users can quickly become overwhelmed by the number of parameters displayed in user interfaces of CI jobs, making running a CI job much more burdensome and confusing than it might otherwise be.

In many situations that involve conditional parameters, such as typical web forms, programmers may use client-side scripting (e.g., JavaScript) to selectively show and hide particular UI content. CI tools often enforce sandbox restrictions, however, which block the execution of client-side scripts. Thus, the common way of showing and hiding UI content is not available when using these CI tools. What is needed, therefore, is a way of conditionally displaying UI content for parameters of a CI job, which may be used even in situations in which the CI tool blocks client-side scripts.

To address the above need at least in part, an improved technique for managing a user interface in a continuous integration (CI) environment includes providing user-interface (UI) regions in a UI page downloaded from a server. The UI regions correspond to respective parameters of a CI job. In response to a change in a particular parameter associated with a UI region, the technique further includes updating, by the server, the UI page to contain code configured to hide a specified set of other UI regions, such as those rendered irrelevant based on the parameter change. For example, the code may specify styles that selectively show or hide specified UI regions. Advantageously, the improved technique allows the visibility of UI content to be dynamically controlled, even in cases in which the UI page blocks client-side scripts. The situation is therefore avoided in which users are overwhelmed with parameters that are not relevant to the CI job to be run.

Certain embodiments are directed to a method of facilitating selective display of parameters in a continuous-integration (CI) system. The method includes accessing, by a server of the CI system, a plurality of parameters for a specified job and transmitting, by the server, a user interface (UI) page to a client device, the UI page including a plurality of UI regions, the UI regions of the plurality of UI regions corresponding to respective parameters of the plurality of parameters. In response to a parameter change in a particular UI region of the plurality of UI regions in the UI page on the client device, the method further includes updating, by the server, the UI page to include code configured to hide a specified set of other UI regions of the plurality of UI regions, such that the UI page is displayed by the client device without showing the specified set of other UI regions.

Other embodiments are directed to a computerized apparatus constructed and arranged to perform a method of facilitating selective display of parameters, such as the method described above. Still other embodiments are directed to a computer program product. The computer program product stores instructions which, when executed on control circuitry of a computerized apparatus, cause the computerized apparatus to perform a method of facilitating selective display of parameters, such as the method described above.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views.

DETAILED DESCRIPTION

Embodiments of the improved technique will now be described. One should appreciate that such embodiments are provided by way of example to illustrate certain features and principles but are not intended to be limiting.

An improved technique for managing a user interface in a continuous integration (CI) environment includes providing user-interface (UI) regions in a UI page downloaded from a server, where the UI regions correspond to respective parameters of a CI job. In response to a change in a particular parameter associated with a UI region, the technique further includes updating, by the server, the UI page to contain code configured to hide a specified set of other UI regions, such as those rendered irrelevant based on the parameter change.

Figure 1:
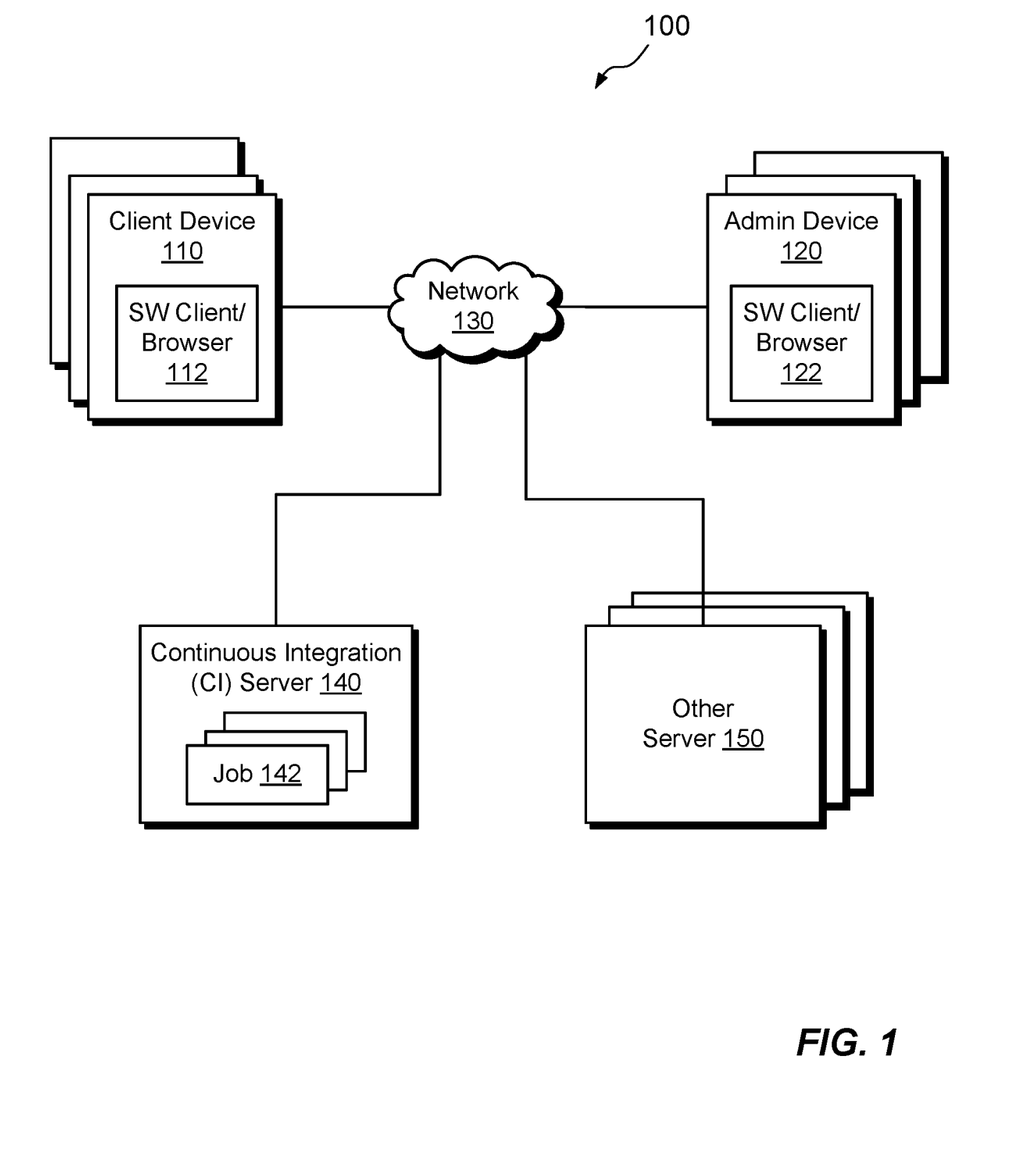
FIG. 1 is a block diagram of an example continuous integration (CI) system in which embodiments of the improved technique can be practiced.

FIG. 1 shows an example environment 100 in which embodiments of the improved technique can be practiced. Here, any number of client devices 110 and any number of administrative devices 120 are configured to access a continuous integration (CI) server 140 over a network 130. The CI server 140 is arranged to run any number of jobs 142, such as CI jobs that enable continuous development, test, and deployment of software from multiple contributors. Such jobs 142 may involve accessing other servers 150, such as deployment servers, testing servers, source code repositories, virtual machine servers, and/or the like. Some jobs may include multiple sub-jobs arranged in a pipeline, whereas other jobs may include just a single job.

A CI job 142 typically presents a user interface, which enables users of client devices 110 to set job parameters via a software client or browser 112. A job 142 may also present an administrative console to users of administrative devices 120 (e.g., administrators), who may apply job settings via a software client or browser 122. The examples described going forward assume the use of browsers for accessing user interfaces and consoles. Other front-end programs, such as applications or apps, are also permitted, however.

The client devices 110 and administrative devices 120 may be any type of computing device (or devices) capable of connecting to the CI server 140 over the network 130 and running software for operating user interfaces. These include, without limitation, desktop computers, workstations, laptop computers, tablet computers, smart phones, personal data assistants, and the like. No features necessarily distinguish client devices 110 from administrative devices 120, other than the privileges of their users in accessing jobs 142. Also, the network 130 may be any type of network or combination of networks, such as a local area network (LAN), a wide area network (WAN), a storage area network (SAN), the Internet, and/or some other type of network or combination of networks.

In example operation, administrators of administrative devices 120 access the CI server 140 and configure particular jobs 142. A job 142 may involve numerous parameters that affect how the job runs. Administrators may define these parameters by providing a list of parameters to the CI server 140, e.g., in a file or server script. Some parameters have settings that are also configured at this time. Once a job 142 has been created with parameters defined and settings established, the job 142 may be made available to users of client devices 110. A user may access a user interface of the job 142, specify parameters desired for the particular execution of the job 142 (assisted by improvements described herein), and then run the job 142 with the specified parameters. To give just one example, the job 142 may upload new source code developed by the user to a source code repository, perform various tests on the uploaded source code, perform a new software build that includes the new source code, and post the new build to a deployment server.

Figure 2:
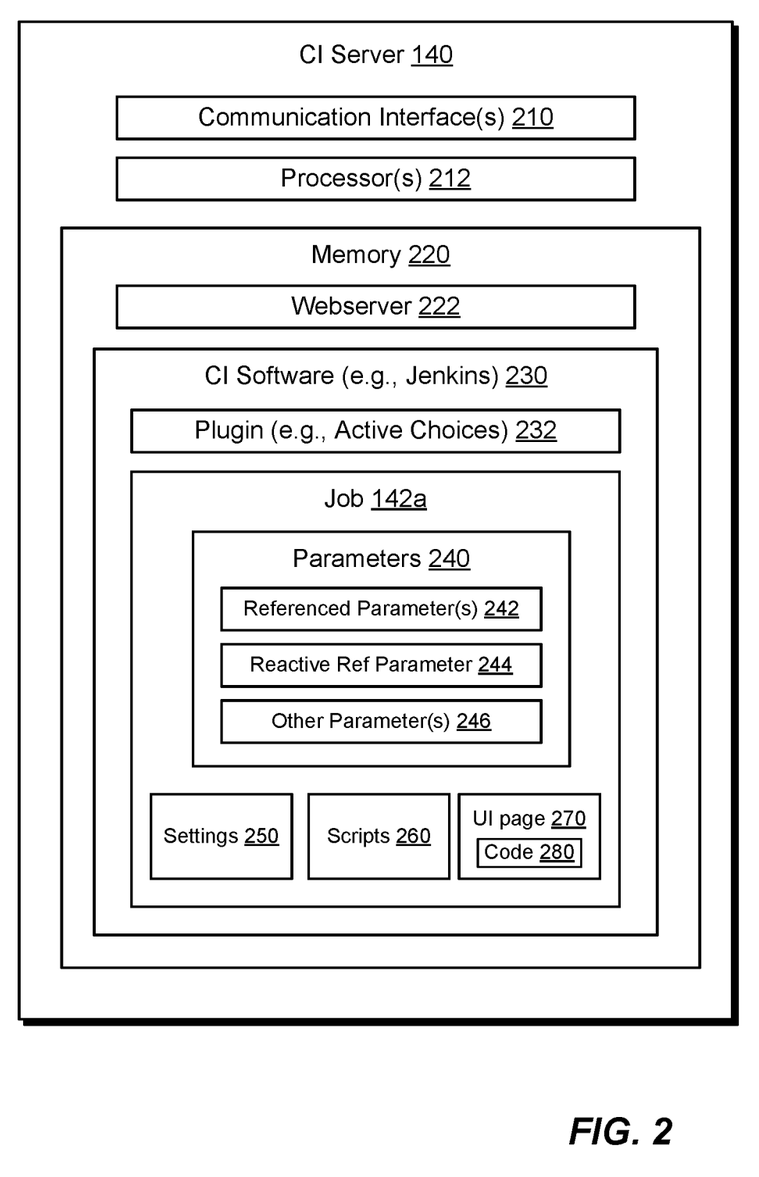
FIG. 2 is a block diagram of an example CI server of the CI system in greater detail.

FIG. 2 shows an example embodiment of the CI server 140 in additional detail. As shown, the example CI server 140 includes one or more communication interfaces 210, a set of processors 212, and memory 220. The communication interfaces 210 include, for example, network interface adapters for converting electronic and/or optical signals received over the network 130 to electronic form for use by the CI server 140. The set of processors 212 includes one or more processing chips and/or assemblies, such as numerous multi-core CPUs (central processing units). The memory 220 includes both volatile memory, e.g., RAM (Random Access Memory), and non-volatile memory, such as one or more ROMs (Read-Only Memories), disk drives, solid state drives, and the like. The set of processors 212 and the memory 220 together form control circuitry, which is constructed and arranged to carry out various methods and functions as described herein. Also, the memory 220 includes a variety of software constructs realized in the form of executable instructions. When the executable instructions are run by the set of processors 212, the set of processors 212 is made to carry out the operations of the software constructs. Although certain software constructs are specifically shown and described, it is understood that the memory 220 typically includes many other software components, which are not shown, such as an operating system, various applications, processes, and daemons.

As further shown in FIG. 2, the memory 220 "includes," i.e., realizes by execution of software instructions, a web-server 222 and CI software 230, which may be configured with a plugin 232. In the example shown, the CI software 230 is Jenkins and the plugin 232 is the Active Choices plugin for Jenkins. As is known, Active Choices provides a framework for creating scripted, dynamic, and interactive job parameters in Jenkins. Such parameters may be dynamically updated and rendered as combo boxes, checkboxes, radio buttons, or HTML UI widgets, for example. Additional information about Active Choices may be found at https://plugins.jenkins.io/uno-choice/.

The examples that follow involve the use of Jenkins as the CI software 230, with its functionality augmented by the Active Choices plugin. However, it is believed that similar functionality may be achieved with other CI software (e.g., CircleCI, TeamCity, Bamboo, and GitLab), which may or may not involve any special plugin.

As further shown in FIG. 2, the CI software 230 is configured to run a particular job 142a. The job 142a may include parameters 240, settings 250, scripts 260, and a UI page 270, such as an HTML web page downloadable to client devices 110. The parameters 240 may include referenced parameters 242, reactive reference parameters 244, and other parameters 246, which may simply be parameters that are neither referenced parameters 242 nor reactive reference parameters 244.

Active Choices does not directly provide a solution for controlling the visibility of job parameters, but we have recognized that such functionality can be achieved through the use of specialized scripts and settings. For example, an administrator may define, as Active Choices settings, a list of referenced parameters 242 and a reactive reference parameter 244. The reactive reference parameter 244 forms part of the UI page 270 and can be modified by scripts (e.g., Groovy scripts; Groovy is a scripting language supported by Jenkins) that run on the CI server 140. The referenced parameters 242 are job parameters which, when changed, cause values of the referenced parameters to be passed to associated scripts on the server and trigger an auto-refresh of the reactive reference parameter 244. This functionality enables portions of the UI page 270 to be refreshed whenever a referenced parameter 242 is changed.

Embodiments of the disclosure leverage this framework by defining referenced parameters 242 as job parameters that determine the display of other specified parameters, and by configuring a reactive reference parameter 244 to incorporate code 280 that can selectively hide parameters that are not required for display. Such code 280 may include HTML code and/or CSS code, for example. In a particular example, the code 280 includes styles presented as CSS selectors that can selectively hide specified content on the UI page 270. The use of such code 280, such as styles, enables the technique disclosed herein to circumvent sandbox restrictions that prohibit the use of JavaScript or other client-side scripting. Selective hiding of UI regions can thus be achieved even without the use of JavaScript.

For instance, a client device 110 may download the UI page 270 for configuring parameters for the job 142a. The downloaded page 270 may include referenced parameters 242 and a reactive reference parameter 244. Any time a referenced parameter 242 is changed on the UI page 270 (e.g., by a user changing a parameter), an automatic refresh of the reactive reference parameter 244 is initiated. The CI server 140 responds to this refresh by running a script (e.g., a Groovy script) that checks the changed referenced parameter 242 and constructs code 280 that is configured to hide a specified set of parameters based on the new value of the changed referenced parameter 242. The specified set of parameters may be identified in the script itself or in some other data source, for example. The CI server 140 then updates the reactive reference parameter 244 to include the code 280 and returns the reactive reference parameter 244 in the UI page 270. The UI page 270 updates to reflect the changes specified by the code 280, i.e., by hiding the specified set of parameters. Based on the operation of the Active Choices plugin, any parameters not explicitly hidden are displayed.

Figure 3:
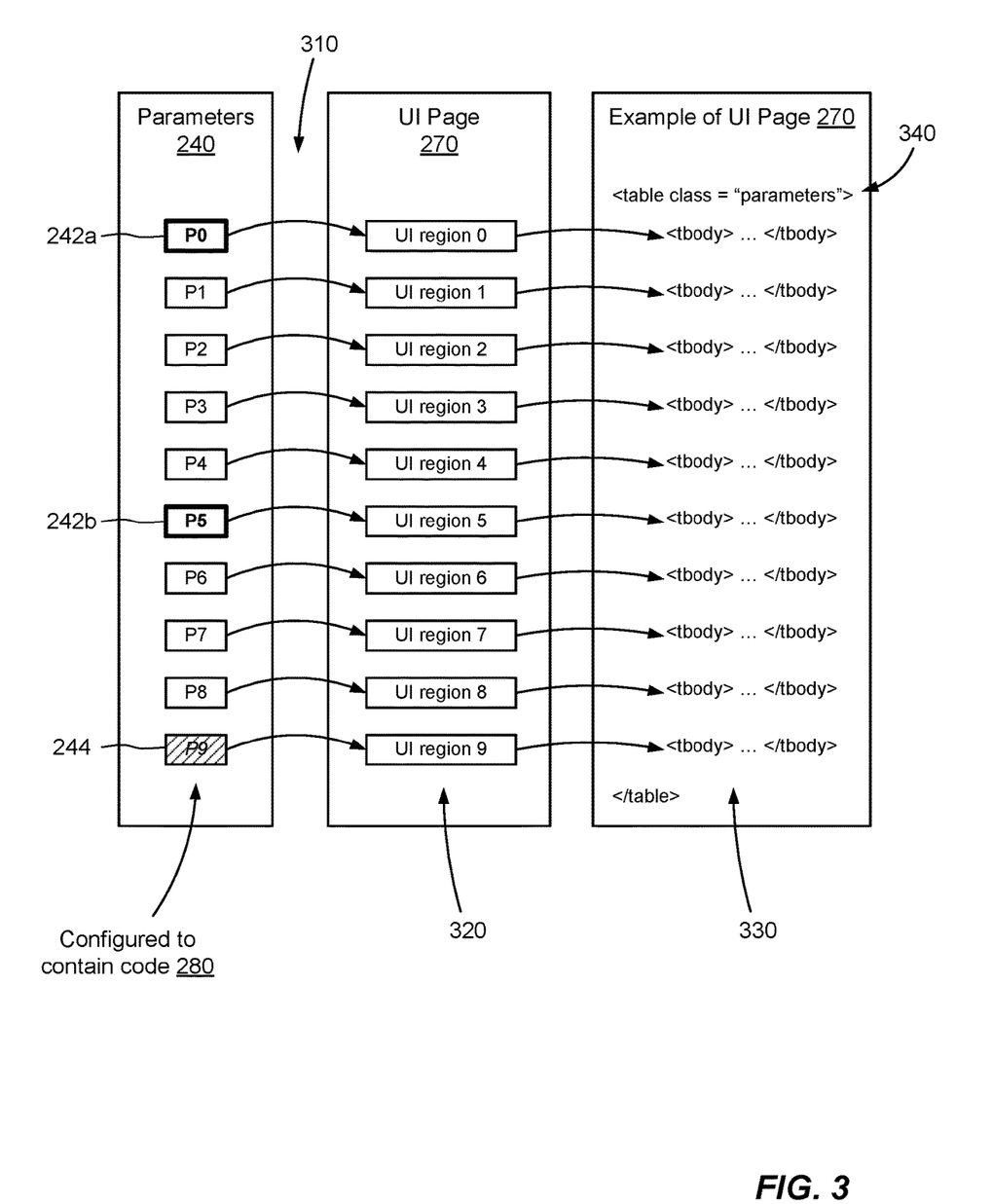
FIG. 3 is a block diagram that shows example relationships among parameters of a CI job, user-interface (UI) regions of a UI page that presents a user interface for setting parameters of the CI job, and example HTML (HyperText Markup Language) structures in which the UI regions may be implemented.

FIG. 3 shows an example arrangement for associating parameters 240 of CI job 142a with UI regions 320 on the UI page 270. Here, ten parameters (P0 through P9) are shown, with the understanding that jobs 142 may include any number of parameters, such as tens or hundreds. Depending on implementation, UI regions 320 need not be associated with certain parameters, such as administrative settings, as such parameters may not be user configurable. In the depicted example, we assume that each parameter 140 is associated with a respective UI region 320.

UI regions 320 are regions of UI page 270 that provide user-interface content for respective parameters 240. The content may include labels, drop-down lists, checkboxes, data-entry fields, and the like, which may be used for establishing values of parameters and for displaying instructions, descriptions, and the like.

As shown in the specific example to the right of FIG. 3, the UI regions 320 may be provided within respective containers, such as HTML <tbody> containers 330 of an HTML table 340. Other candidates for containers may include <div> elements, <span> elements, or the like. The <tbody> containers may include table rows (<tr> elements) and table data (<td> elements), which may themselves include any number of HTML and have any number of CSS elements. This arrangement affords a great deal of flexibility in displaying UI content. Providing UI regions 320 within containers, such as <tbody> containers, enables UI regions 320 to be selectively hidden using code, such as styles, configured to hide those containers.

Although the UI regions 320 are numbered 0 through 9, one should appreciate that UI regions 320 need not be expressly enumerated. Indeed, the <tbody> elements shown to the right provide no enumeration. They also provide no names or other identifiers. Rather, particular <tbody> elements 330 may be addressed based on their locations within the table 340.

In an example, the sequence of <tbody> elements within the table 340 mirrors the sequence of parameters 240 (P0 through P9). This sequence of parameters may simply reflect the order in which the parameters 240 are defined in a data file or script on the CI server 140. In Jenkins, for example, the Jenkins software generates the UI page 270, including the table 340. The Jenkins software assigns <tbody> elements 330 to the parameters 240 by accessing the parameters 240 (e.g., from a file or script), and creating a respective <tbody> container for each parameter 240. Thus, the correspondence between parameters 240 and <tbody> containers is established by design. To address the <tbody> element for a particular parameter 240, one need only know the number of the corresponding parameter 240 in the sequence of parameters. For example, to address the <tbody> element for parameter P3 (the fourth parameter in the parameter sequence), one need merely look to the fourth <tbody> element of the table 340. This <tbody> element can then be accessed using CSS code, e.g., as the fourth <tbody> child of the table 340, using the CSS selector "tbody:nth-child(4)".

As further shown in FIG. 3, some parameters 240 are defined as referenced parameters 242. For example, an administrator may define parameters P0 and P5 (shown in bold) as referenced parameters 242a and 242b. The administrator may also define parameter P9 (shown in shading) as a reactive reference parameter 244. The referenced parameters P0 and P5 are those which, when changed based on user action, trigger the CI server 140 to run respective event scripts. Results of the event scripts can then be returned to the UI page 270 via the reactive reference parameter P9, where the results may perform actions on the UI page 270. For example, event scripts may generate code 280 in response to any change in referenced parameters 242a or 242b, and such code 280 may direct a specified set of UI regions (e.g., <tbody> containers) to be hidden. For example, the code 280 may direct parameter P3 to be hidden using the CSS code ".parameters> tbody:nth-child(4){display:none;}". Referenced parameters P0 and P5 and reactive reference parameter P9 may be established when configuring the job 142a, e.g., by an administrator operating an administrative console of Jenkins to establish Active Choices parameter settings. In an example, the administrator may give a name to the reactive reference parameter P9, such as "hidden_visibility_controller," and may assign P9 as type "Formatted Hidden HTML." This setting prevents P9 from being seen or modified by users.

In an example, a script, such as a Groovy script, defines the specified set of UI regions to be hidden. Assume, for example, that parameter P0 is a Boolean. If P0 is set to true, then parameters P1 and P2 become relevant but parameter P3 becomes irrelevant. Likewise, if P0 is set to false, then P3 becomes relevant but P1 and P2 become irrelevant. In this case, the script may designate P3 for hiding when P0 is true, and may designate P1 and P2 for hiding when P0 is false. Any parameter not expressly hidden is displayed by default.

Figure 4A:
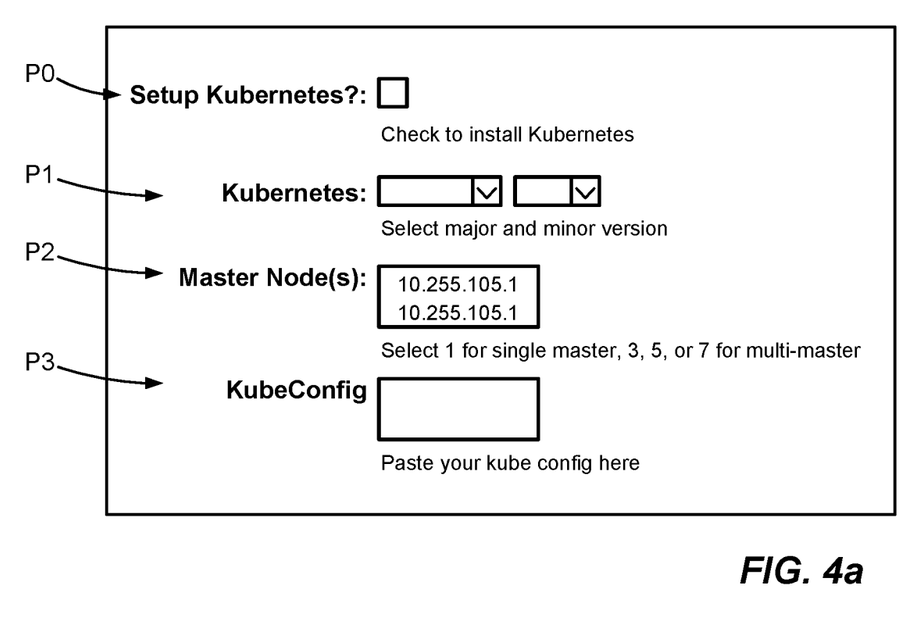
FIGS. 4a-4c show various examples of a portion of a UI page as rendered on a client device, without the disclosed improvements of the instant disclosure (FIG. 4a), with the improvements in response to a particular parameter being set to true (FIG. 4b), and with the improvements in response to the particular parameter being set to false (FIG. 4c).
Figure 4B:
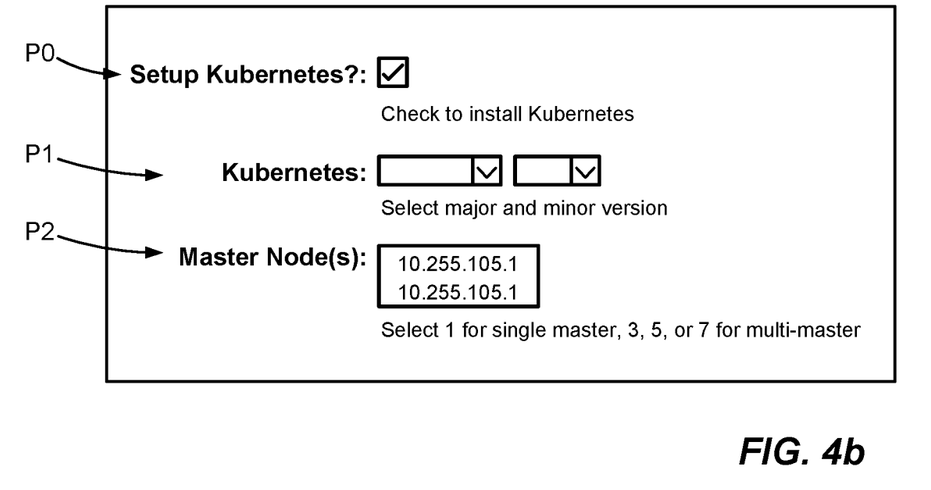
Figure 4C:
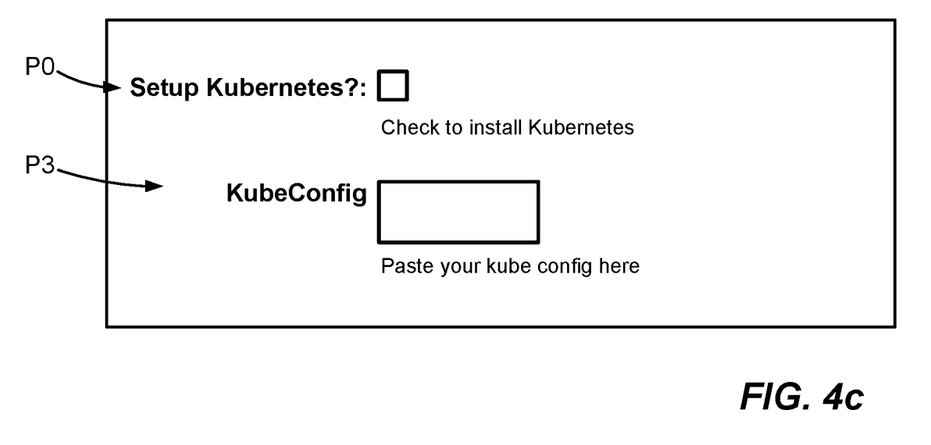

FIGS. 4a-4c show graphical depictions related to the above example. FIG. 4a shows a scenario without the improvements of the instant disclosure, i.e., what Jenkins would show by default. In the example, only a portion of the UI page 270 as rendered by a client device is shown.

In FIG. 4a, parameter P0 is represented by a UI region (e.g., a <tbody> element) that includes the label "Setup Kubernetes?:", as well as a checkbox and an instruction label, "Check to install Kubernetes". P1, P2, and P3 are represented by additional UI regions and include their own respective UI content. Given that the improvements of the instant disclosure are not used, the UI regions for all parameters P0, P1, P2, and P3 are shown. Thus, the user of the client device 110 is faced with more choices than necessary and indeed may not know which parameters require entry and which do not.

Turning now to FIG. 4b, we see the same portion of the UI page 270 as in FIG. 4a, but this time with the benefit of the improvements described herein. In this case, the user has checked the checkbox for P0, indicating that P0 has been set to "true." In accordance with the logic described above, this setting causes the UI region for P3 to be hidden but the UI regions for P1 and P2 to be shown.

FIG. 4c shows the alternative choice with the benefit of the improvements herein. As shown, P0 has been set to false, which causes the UI regions for P1 and P2 to be hidden and the UI region for P3 to be shown.

In the examples of FIGS. 4b and 4c, the user is presented with only those UI regions that are relevant given the user's previous selection. Irrelevant content is hidden, and the user's task is greatly simplified as the user only sees UI regions for parameters that are actually needed.

Figure 5:
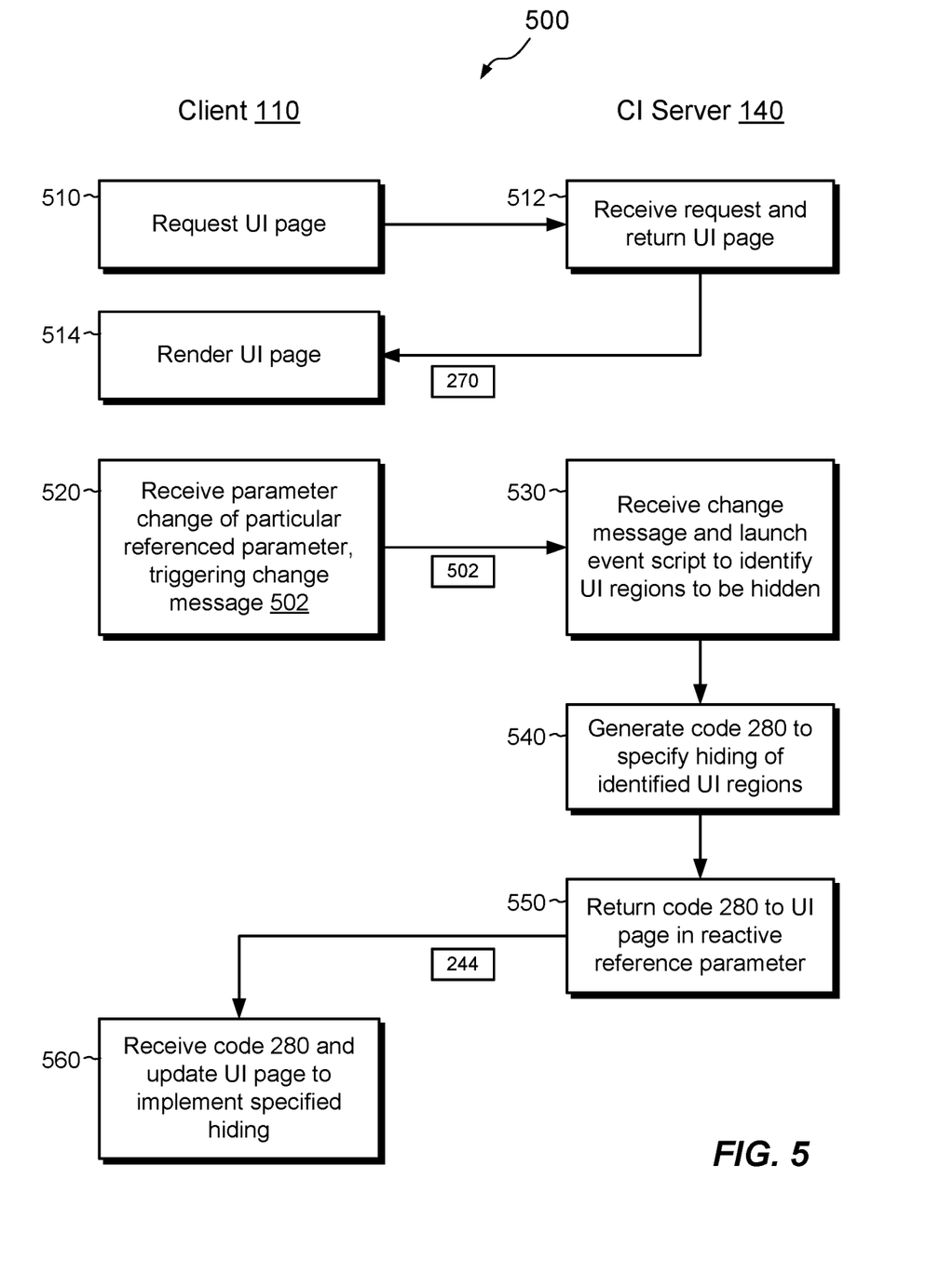
FIG. 5 is a flowchart showing an example method of selectively hiding parameters on a UI page.
Figure 6:
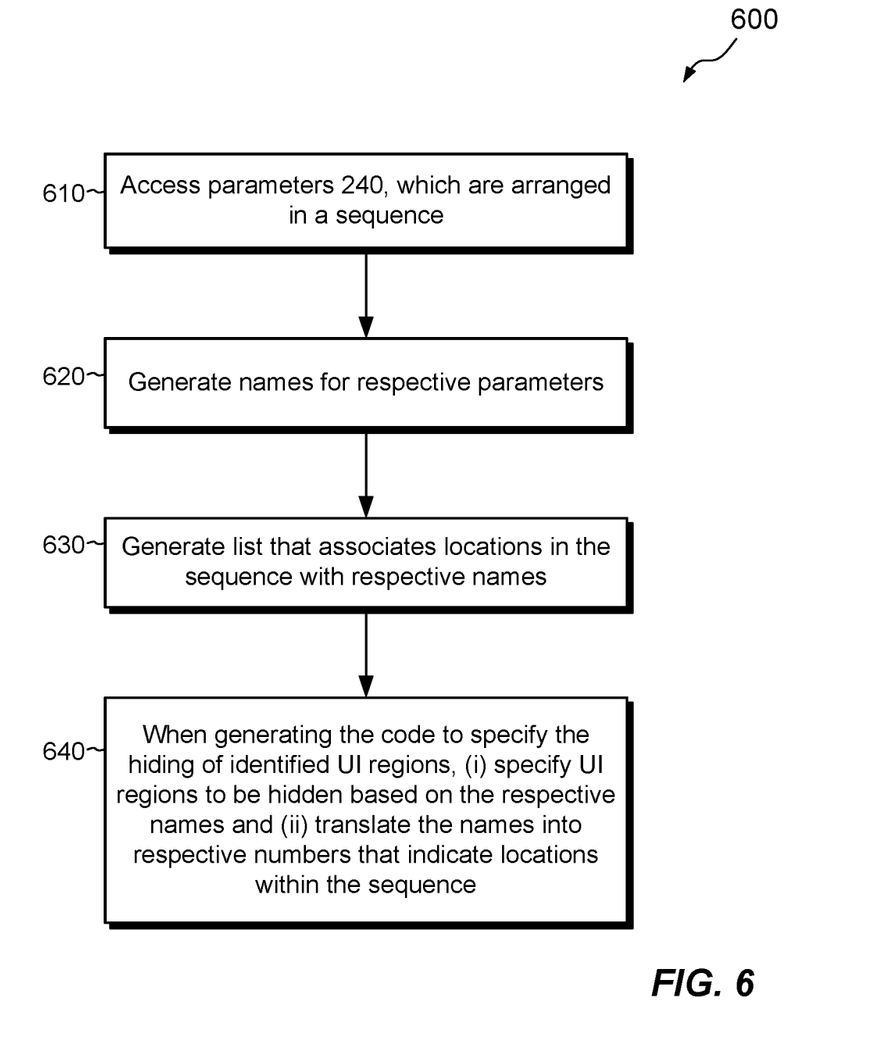
FIG. 6 is a flowchart showing an example method of using names for parameters in scripts that run on a server.
Figure 7:
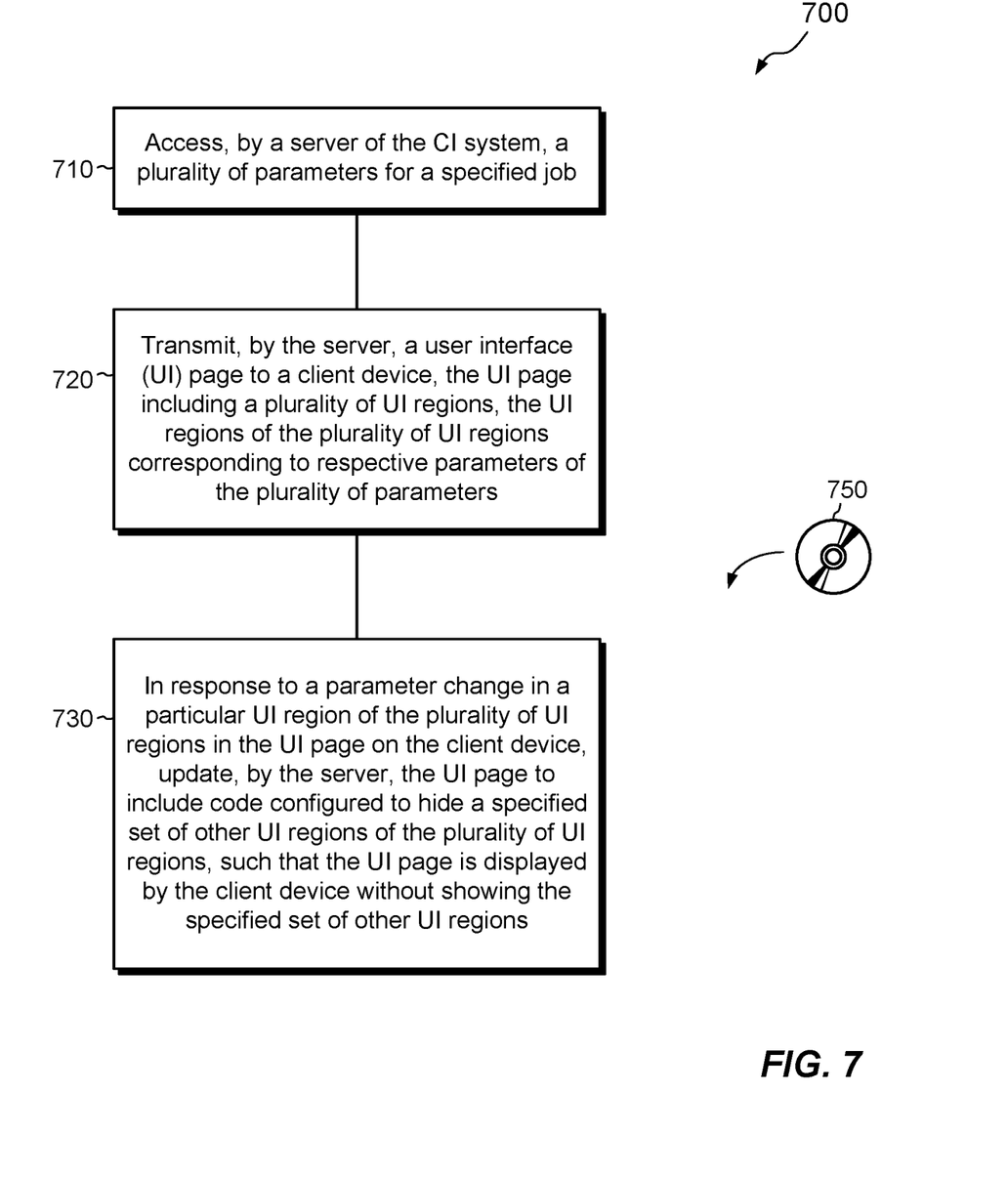
FIG. 7 is a flowchart showing an example method of facilitating selective display of parameters in a CI system, such as the one shown in FIG. 1.

FIGS. 5-7 show example methods that may be carried out in connection with the CI system 100. The methods of FIGS. 5-7 are typically performed, for example, by the software constructs described in connection with FIG. 2, which reside in the memory 220 of the CI server 140 and are run by the set of processors 212. In addition, some acts may be performed by a client device 110. The various acts of these methods may be ordered in any suitable way. Accordingly, embodiments may be constructed in which acts are performed in orders different from those illustrated, which may include performing some acts simultaneously.

FIG. 5 shows an example method 500 of selectively hiding parameters on a UI page, such as UI page 270 provided for job 142a. As shown, the method 500 involves activities at both a client device 110 and the CI server 140.

At 510, the client device 110 sends a request to download the UI page 270. For example, a user of client device 110 launches a web browser (e.g., Chrome, Firefox, Edge, etc.) and enters a URL (Uniform Resource Locator) or clicks a local link to UI page 270 on the CI server 140. In a client-server arrangement, the user may instead launch a client application or app. For this example, we assume that a browser is used, but those skilled in the art will readily understand how corresponding operations may be achieved in a client-server application.

At 512, the CI server 140 receives the request and responds by returning the UI page 270. In some examples, the UI page 270 is already present in complete form when the request is received, so that the CI server 140 need only return the pre-existing UI page 270 to the client device 110, e.g., via the webserver 222. In other examples, the UI page 270 may be partially or entirely generated in response to the request. Also, the CI server 140, e.g., working alone or in concert with the Active Choices plugin, may cause certain scripts to be run at startup, so that the UI page 270 and the CI server 140 are both initialized in a way that supports the desired functionality.

At 514, the client device 110 receives the UI page 270 and renders the UI page 270 in the browser. The UI page 270 includes numerous UI regions 320 (e.g., implemented as <tbody> elements 330), which correspond to respective parameters 240 of the job 142a. The user of client device 110 may interact with the UI page 270, e.g., by reading instructions, clicking checkboxes, clicking radio buttons, entering text, and so forth.

At 520, the UI page 270 receives a parameter change to a referenced parameter 242. For example, the user may click a checkbox for property P0, which has been defined as referenced parameter 242a (FIGS. 3 and 4b). Based on functionality supported in this example by the Active Choices plugin, changing the referenced parameter P0 results in a communication with the CI server 140. For example, the browser on the client device 110 sends a message 502 to the CI server 140 informing it that referenced parameter P0 has changed and the value of parameter P0. The message 502 may take any suitable form.

At 530, the CI server 140 receives the message 502 and, in response to receipt of the message 502, launches an event script. The event script may be specific to parameter P0 and may define a specified set of UI regions to be hidden or shown based on the state of P0. A non-limiting example of such an event script for parameter P0 is shown in the following script:

if (setupKube){[Script 1]
  hideSelectorsList.add("${getSelector('kubeconfig')}")
}else{
  hideSelectorsList.add("${getSelector('kubernetes')}")
  hideSelectorsList.add("${getSelector('kubernetes_minor')}")
}.

Here, the event script checks the state of parameter P0, which is given the name "setupKube" above. If P0 is true, the script adds a UI region 320 for parameter P3 (named "kubeconfig") to a hide list. If P0 is false, the script adds UI regions for parameters P1 ("Kubernetes") and P2 ("kubernetes_minor") to the hide list. Although parameter P0 is depicted as a Boolean, one should appreciate that parameters are not limited to Booleans but can be of any data type.

In an example, the getSelector function of Script 1 is implemented as follows:

index=param_names[name]+1 [Script 2]
return ".parameters> tbody:nth-child(index)".

The first instruction ("index=param_names[name]+1") performs a lookup by name into a list (e.g., an array or other data structure) called "param_names" and receives back a location associated with the specified name. The location identifies the element of the array (or other data structure) param_names, which corresponds to the parameter 240 being changed. Thus, for example, the location returned by param_names["kubeconfig" ] would be "3," as the name kubeconfig corresponds to parameter P3. An "index" is then computed by adding "1" to this returned location, which enables an associated UI region (<tbody> element) to be addressed. For example, location 3 corresponds to the fourth <tbody> element, and Script 2 identifies this fourth <tbody> element using the CSS code ".parameters> tbody:nth-child (index)", where "index" equals 4. By operation of the hideSelectorList.add function (Script 1), this fourth <tbody> element is added to the hide list. If additional parameters had been affected by the change in P0, then CSS code would be provided for each parameter to be hidden, and such CSS code for all parameters to be hidden would be added to the hide list.

At 540, the CI server 140 generates code 280 configured to effectuate hiding of the specified UI regions to be hidden. For example, a visibility controller script (Script 3) accesses the hide list and iterates over its contents. For each parameter to be hidden, the visibility controller may generate an instruction similar to the following:

.parameters> tbody:nth-child(4){display:none;}. [Script 3]

The visibility controller may then concatenate any number of instructions like Script 3, i.e., one for each parameter to be hidden, to form the code 280.

At 550, the CI server 140 returns the generated code 280 to the client device 110 in the reactive reference parameter 244 (P9).

At 560, the client device 110 receives the code 280 in the reactive reference parameter 244 and updates the UI page 270. For example, the UI page 270 is configured automatically to refresh all <tbody> elements that follow the changed referenced parameter P0 based on the display settings specified by the code 280 in the reactive reference parameter 244. Any <tbody> element not expressly hidden by the code 280 is displayed.

In the above example, names are used rather than numbers to assist administrators and to promote readability and maintainability of scripts. For example, nothing prevents Script 1 from referring to parameter P0 as "0" rather than as "kubeconfig". Names are usually easier for humans to recognize and remember than numbers, however.

FIG. 6 shows an example method 600 of facilitating the use of parameter names when running scripts. At 610, the CI server accesses a list of parameters 240, e.g., from a file or script. The parameters 240 are arranged in a sequence, such as the one shown in FIG. 3.

At 620, names are generated for respective parameters. In some examples, the names are assigned by the CI server 140 automatically, based on the listed parameters. Alternatively, the names are assigned by an administrator. As yet another option, the names are assigned automatically but then adjusted by an administrator to be more descriptive.

At 630, a list is generated which associates the names of parameters with respective locations in the sequence. The list may be provided as an array or other data structure. For example, the CI server 140 runs a script that iterates over the parameters 240 in order and executes the code "param_names.put(name)", where "param_names.put" writes the specified "name" to the next location in the array or data structure. In an example, act 630 is performed when the UI page 270 is downloaded to the client device 110. Thus, the array or other data structure may be constructed in real time each time the UI page 270 is downloaded. This arrangement ensures that the array or other data structure is always up to date, even after new parameters have been added.

At 640, when generating the code 280, which directs the hiding of specified UI regions 320, the UI regions to be hidden may be identified by respective names (as in Script 1), and the names can be translated into respective numbers (as in Script 2), which indicate respective locations within the sequence of parameters, and thus locations within the sequence of UI regions (<tbody> elements).

FIG. 7 shows an example method 700 of facilitating selective display of parameters in a CI system and provides a summary of some of the features described above. At 710, a plurality of parameters 240 for a specified job 142a is accessed by a server 140 of a CI system 100. For example, CI server 140 accesses parameters 240 from a file or script.

At 720, the server 140 transmits a UI page 270 to a client device 110. The UI page 270 includes a plurality of UI regions 320, and the UI regions of the plurality of UI regions 320 correspond to respective parameters 240 of the plurality of parameters. For example, the UI regions 320 may be provided as <tbody> elements or other HTML containers that correspond to respective parameters 240.

At 730, in response to a parameter change in a particular UI region (e.g., the region for P0) of the plurality of UI regions in the UI page 270 on the client device 110, the server 140 updates the UI page 270 to include code 280 configured to hide a specified set of other UI regions (e.g., P3, or P1 and P2) of the plurality of UI regions, such that the UI page 270 is displayed by the client device 110 without showing the specified set of other UI regions. For example, the CI server 140 may provide the code 280 in a reactive reference parameter, and the UI page 270 may respond to an update of that reactive reference parameter by running the code 280 in the UI page to implement hiding of the specified UI elements.

An improved technique has been described for managing a user interface in a continuous integration (CI) environment 100. The technique includes providing user-interface (UI) regions 320 in a UI page 270 downloaded from a server 140. The UI regions 320 correspond to respective parameters 240 of a CI job 142a. In response to a change in a particular parameter associated with a UI region, the technique further includes updating, by the server 140, the UI page 270 to contain code 280 configured to hide a specified set of other UI regions, such as those rendered irrelevant based on the parameter change. Advantageously, the improved technique allows the visibility of UI content to be dynamically controlled and can be applied even in cases in which the UI page blocks client-side scripts.

Having described certain embodiments, numerous alternative embodiments or variations can be made. For instance, although embodiments have been described in connection with a CI system, this is merely an example. Alternatively, the principles disclosed may be applied in the context of any web application or client-server application that includes a user interface in which user selections may render other selections irrelevant.

Further, although features have been shown and described with reference to particular embodiments hereof, such features may be included and hereby are included in any of the disclosed embodiments and their variants. Thus, it is understood that features disclosed in connection with any embodiment are included in any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 750 in FIG. 7). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should be interpreted as meaning "based at least in part on" unless specifically indicated otherwise. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

What is claimed is:

1. A method of facilitating selective display of parameters in a continuous-integration (CI) system, comprising:
    accessing, by a server of the CI system, a plurality of parameters for a specified job;
    transmitting, by the server, a user interface (UI) page to a client device, the UI page including a plurality of UI regions, the UI regions of the plurality of UI regions corresponding to respective parameters of the plurality of parameters; and
    in response to a user-initiated parameter change in a particular UI region of the plurality of UI regions in the UI page on the client device and while blocking client-side scripts from running for showing and/or hiding UI regions, updating, by the server, the UI page to include code configured to hide a specified set of other UI regions of the plurality of UI regions, such that the UI page is displayed by the client device without showing the specified set of other UI regions.

2. The method of claim 1, wherein the parameter change is made to a particular parameter of the plurality of parameters, and wherein the method further comprises:
    receiving, by the server, a setting that identifies the particular parameter as a referenced parameter of the specified job,
    wherein the server is configured to respond to particular changes in the referenced parameter by generating UI code for inclusion in the UI page.

3. The method of claim 2, further comprising receiving, by the server, settings that identify a set of additional parameters of the plurality of parameters as additional referenced parameters of the specified job,
    wherein the server is configured to respond to particular changes in any of the set of additional parameters by generating additional UI code for inclusion in the UI page.

4. The method of claim 2, wherein the code configured to hide the specified set of other UI regions includes at least one of HTML (HyperText Markup Language) code and CSS (Cascading Style Sheets) code, and wherein the method further comprises:
    generating, the code by the server by running a set of scripts; and
    returning the code to the client device for execution within the UI page.

5. The method of claim 4, wherein returning the code includes providing the code in a hidden parameter of the UI page, the hidden parameter defined as part of the specified job.

6. The method of claim 1, wherein the UI page arranges the UI regions of the plurality of UI regions in a sequence of UI regions, wherein the UI regions are individually identifiable based on their locations within the sequence of UI regions, and wherein the method further comprises identifying, in the code, the specified set of other UI regions based on their respective locations within the sequence of UI regions.

7. The method of claim 6, wherein the parameters of the plurality of parameters for the specified job are arranged in a sequence of parameters, and wherein the method further comprises establishing, by the server, the sequence of UI regions based on the sequence of parameters, such that a UI region for a designated parameter is identifiable based on a location of the designated parameter in the sequence of parameters.

8. The method of claim 6, further comprising:
    accessing the plurality of parameters; and
    generating, by the server, a list that associates locations of parameters of the plurality of parameters with respective names.

9. The method of claim 8, wherein generating the list is performed prior to the parameter change at the client device.

10. The method of claim 8, further comprising generating, by the server, the code by running a set of scripts, the set of scripts (i) specifying the specified set of other UI regions based on the respective names and (ii) translating the respective names into corresponding numbers that indicate locations of the specified set of other UI regions within the sequence of UI regions.

11. The method of claim 1, wherein the UI regions of the plurality of UI regions are provided in respective containers of an HTML table in the UI page.

12. A server in a continuous integration (CI) system, the server comprising control circuitry that includes a set of processors coupled to memory, the control circuitry constructed and arranged to:
    access a plurality of parameters for a specified job;
    transmit a user interface (UI) page to a client device, the UI page including a plurality of UI regions, the UI regions of the plurality of UI regions corresponding to respective parameters of the plurality of parameters; and
    in response to a user-initiated parameter change in a particular UI region of the plurality of UI regions in the UI page on the client device and while blocking client-side scripts from running for showing and/or hiding UI regions, update the UI page to include code configured to hide a specified set of other UI regions of the plurality of UI regions, such that the UI page is displayed by the client device without showing the specified set of other UI regions.

13. A computer program product including a set of non-transitory, computer-readable media having instructions which, when executed by control circuitry of a computerized apparatus, cause the computerized apparatus to perform a method of facilitating selective display of parameters in a continuous-integration (CI) system, the method comprising:

accessing a plurality of parameters for a specified job;

transmitting a user interface (UI) page to a client device, the UI page including a plurality of UI regions, the UI regions of the plurality of UI regions corresponding to respective parameters of the plurality of parameters; and in response to a user-initiated parameter change in a particular UI region of the plurality of UI regions in the UI page on the client device and while blocking client-side scripts from running for showing and/or hiding UI regions, updating the UI page to include code configured to hide a specified set of other UI regions of the plurality of UI regions, such that the UI page is displayed by the client device without showing the specified set of other UI regions.

14. The computer program product of claim 13, wherein the parameter change is made to a particular parameter of the plurality of parameters, and wherein the method further comprises:

receiving a setting that identifies the particular parameter as a referenced parameter of the specified job; and responding to particular changes in the referenced parameter by generating UI code for inclusion in the UI page.

15. The computer program product of claim 14, wherein the code configured to hide the specified set of other UI regions includes at least one of HTML (HyperText Markup Language) code and CSS (Cascading Style Sheets) code, and wherein the method further comprises:

generating, the code by running a set of scripts; and returning the code to the client device for execution within the UI page.

16. The computer program product of claim 15, wherein returning the code includes providing the code in a hidden parameter of the UI page, the hidden parameter defined as part of the specified job.

17. The computer program product of claim 13, wherein the UI page arranges the UI regions of the plurality of UI regions in a sequence of UI regions, wherein the UI regions are individually identifiable based on their locations within the sequence of UI regions, and wherein the method further comprises identifying, in the code, the specified set of other UI regions based on their respective locations within the sequence of UI regions.

18. The computer program product of claim 17, wherein the parameters of the plurality of parameters for the specified job are arranged in a sequence of parameters, and wherein the method further comprises establishing the sequence of UI regions based on the sequence of parameters, such that a UI region for a designated parameter is identifiable based on a location of the designated parameter in the sequence of parameters.

19. The computer program product of claim 17, wherein the method further comprises:

accessing the plurality of parameters; and generating, prior to the parameter change at the client device, a list that associates locations of parameters of the plurality of parameters with respective names.

20. The computer program product of claim 19, wherein the method further comprises generating the code by running a set of scripts, the set of scripts (i) specifying the specified set of other UI regions based on the respective names and (ii) translating the respective names into corresponding numbers that indicate locations of the specified set of other UI regions within the sequence of UI regions.

21. The method of claim 1, wherein the CI system includes sandbox restrictions that prohibit the use of client-side scripting.

22. The method of claim 1, wherein updating, by the server, the UI page to include the code configured to hide the specified set of other UI regions includes responding to the parameter change in the particular UI region by running a server-side script and triggering an auto-refresh of a reactive reference parameter of the plurality of parameters, the reactive reference parameter then providing the code configured to hide the specified set of other UI regions in the UI page on the client device.

* * * * *